(12) United States Patent
Rajewski

(10) Patent No.: US 6,607,666 B2
(45) Date of Patent: *Aug. 19, 2003

(54) MUD TANK CLEANING SYSTEM

(76) Inventor: Robert C. Rajewski, Box 1390, Stettler, Alberta (CA), T0C 2L0

( * ) Notice: Subject to any disclaimer, the term of this patent is extended or adjusted under 35 U.S.C. 154(b) by 0 days.

This patent is subject to a terminal disclaimer.

(21) Appl. No.: 09/917,527

(22) Filed: Jul. 27, 2001

(65) Prior Publication Data

US 2003/0019811 A1 Jan. 30, 2003

(51) Int. Cl.[7] .............................................. B01D 21/04
(52) U.S. Cl. ........................ 210/241; 210/524; 210/527; 210/536; 175/206
(58) Field of Search ................................ 210/241, 523, 210/524, 527, 532.1, 536; 175/66, 206

(56) References Cited

U.S. PATENT DOCUMENTS

| | | | |
|---|---|---|---|
| 1,911,008 A | | 5/1933 | Withington |
| 2,006,825 A | * | 7/1935 | Downes ................... 210/524 |
| 2,085,150 A | * | 6/1937 | Gemeny ................... 210/524 |
| 2,916,148 A | | 12/1959 | Crane et al. |
| 3,410,412 A | | 11/1968 | Fechter |
| 3,498,466 A | | 3/1970 | Fechter et al. |
| 3,635,349 A | | 1/1972 | Weiss et al. |
| 3,920,558 A | * | 11/1975 | Lind et al. ................. 210/527 |
| 4,213,479 A | | 7/1980 | Pearson |
| 4,377,475 A | | 3/1983 | Wiedemann |
| 4,753,549 A | | 6/1988 | Shook et al. |
| 4,761,039 A | | 8/1988 | Hilaris |
| 4,816,167 A | | 3/1989 | Vanderslice |
| 5,016,717 A | | 5/1991 | Simons et al. |
| 5,021,156 A | | 6/1991 | Sloan |
| 5,212,891 A | | 5/1993 | Schuermann et al. |
| 5,425,188 A | | 6/1995 | Rinker |
| 5,503,753 A | | 4/1996 | Woodall et al. |
| 5,846,440 A | * | 12/1998 | Angelle ..................... 210/527 |

FOREIGN PATENT DOCUMENTS

| | | |
|---|---|---|
| CA | 2317667 | 3/2001 |
| DE | 2 203 865 | 8/1973 |

OTHER PUBLICATIONS

U.S. patent application Ser. No. 09/656,624, Rajewski, filed Sep. 7, 2000.

* cited by examiner

*Primary Examiner*—Christopher Upton
(74) *Attorney, Agent, or Firm*—Christensen O'Connor Johnson Kindness PLLC

(57) ABSTRACT

A mud tank cleaning system includes a debris collection sweep that drives debris towards a collection zone in a mud tank, whence the debris can easily be mechanically disposed of through an opening in the mud tank. Preferably, the collection zone is in a central depressed part of the mud tank to allow gravity to assist in moving debris towards the collection zone. Preferably, a pair of collection sweeps are used on opposed sides of the collection zone. The collection sweeps are preferably pivotally mounted to follow an arcuate path along the surface of a cylindrical confining wall of the mud tank. Sweep drive mechanisms operate the sweeps. The collection sweeps are preferably used in conjunction with a disposal sweep that sweeps debris collected in the collection zone by the collection sweeps out of the collection zone and through the opening in the mud tank, from where it may be readily disposed of. The mud tank is typically operated in conjunction with a hydrovac vehicle.

8 Claims, 8 Drawing Sheets

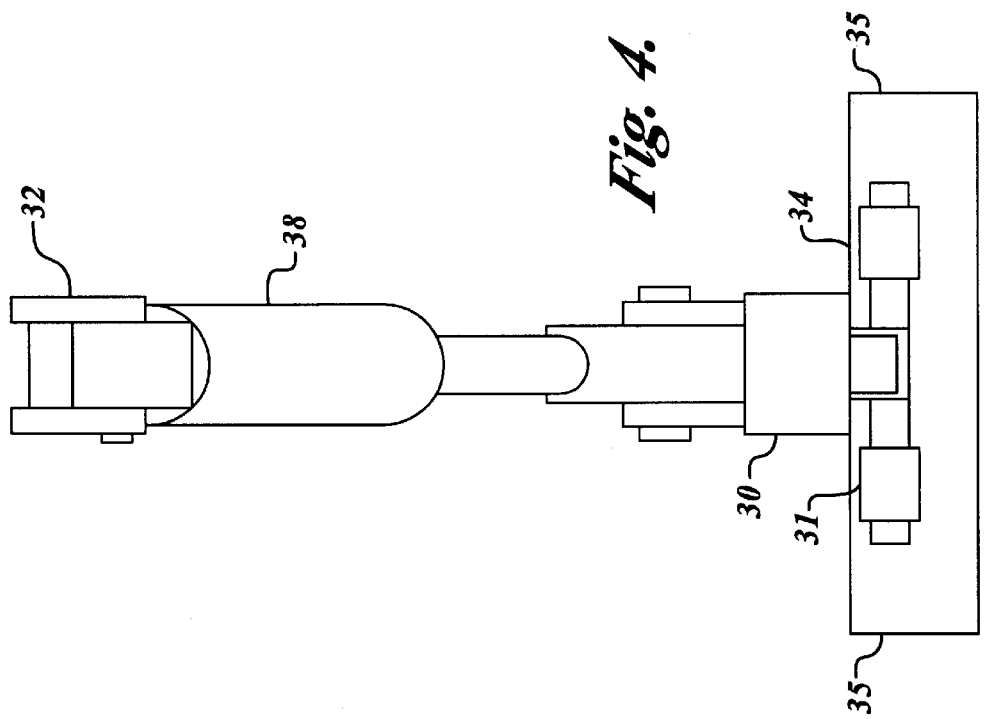
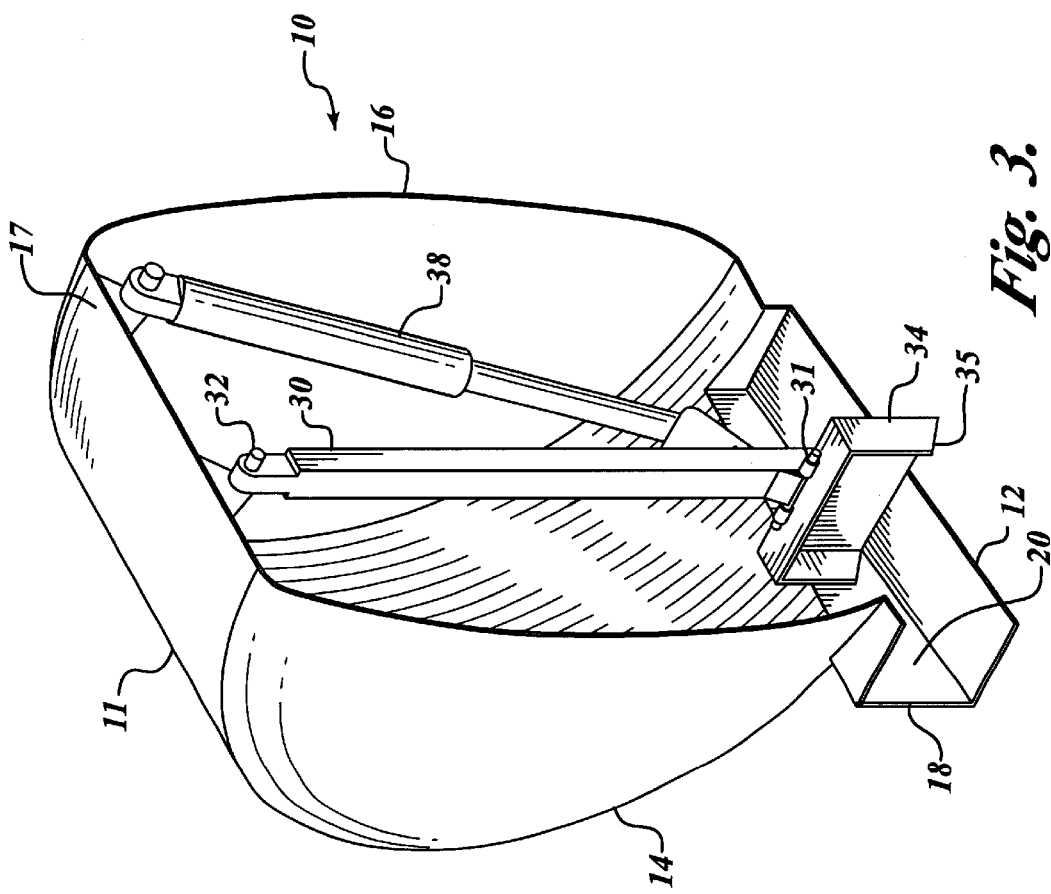

MUD TANK CLEANING SYSTEM

FIELD OF THE INVENTION

This invention relates to devices for cleaning out mud tanks of hydrovac units.

BACKGROUND OF THE INVENTION

In hydrovac operations, water is used to blast a hole or trench in soil and the fluidized soil thus created is sucked into a mud tank. The water in the mud tank is filtered and recirculated for use in blasting the hole, while mud accumulates in the mud tank. Periodically, the mud has to be removed from the mud tank. In the past, removal of the mud has been done with hoists, in which the tank is lifted and the mud dumped. This is not efficient, and the resulting vehicle is fairly complex.

In U.S. patent application Ser. No. 09/656,624, filed Sep. 7, 2000, and Canadian patent application No. 2,317,667, published Mar. 6, 2001, the inventor has proposed a solution to the inefficient removal of mud from a mud tank. In those applications, there is provided, in accordance with an embodiment of the invention, a mud tank cleaning system, comprising a mud tank having confining walls; an opening in the confining walls of the mud tank; a removable cover mounted on the mud tank over the opening; a sweep mounted in the mud tank and being operable to sweep mud in the mud tank towards the opening in the confining walls; and a sweep drive mechanism operably connected to the sweep for operating the sweep. The mud collects in a trough at the base of the confining walls, from where it is swept by the sweep through the opening.

This prior device relies upon gravity to pull debris into the trough. The inventor has now proposed a cleaning mechanism to improve the collection of the debris in the trough and thus facilitate rapid and complete cleaning of the mud tank.

SUMMARY OF THE INVENTION

There is therefore provided, in accordance with an aspect of the invention, a mud tank cleaning system that includes a debris collection sweep that drives debris towards a collection zone in a mud tank, from whence the debris can easily be mechanically disposed of through an opening in the mud tank. Preferably, the collection zone is in a central depressed part of the mud tank to allow gravity to assist in moving debris towards the collection zone. Preferably, a pair of collection sweeps are used on opposed sides of the collection zone. The collection sweeps are preferably pivotally mounted to follow an arcuate path along the surface of a cylindrical confining wall of the mud tank. Sweep drive mechanisms operate the sweeps. The collection sweeps are preferably used in conjunction with a disposal sweep that sweeps debris collected in the collection zone by the collection sweeps out of the collection zone and through the opening in the mud tank, from where it may be readily disposed of. The mud tank is typically operated in conjunction with a hydrovac vehicle.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which:

FIG. 3 is a perspective view of the mud tank of FIG. 1;

FIG. 4 is a top view of a drive mechanism for the mud tank sweep arm;

DETAILED DESCRIPTION OF THE PREFERRED EMBODIMENT

In this patent document, "comprising" means "including." In addition, a reference to an element by the indefinite article "a" does not exclude the possibility that more than one of the elements is present.

Figure 1:
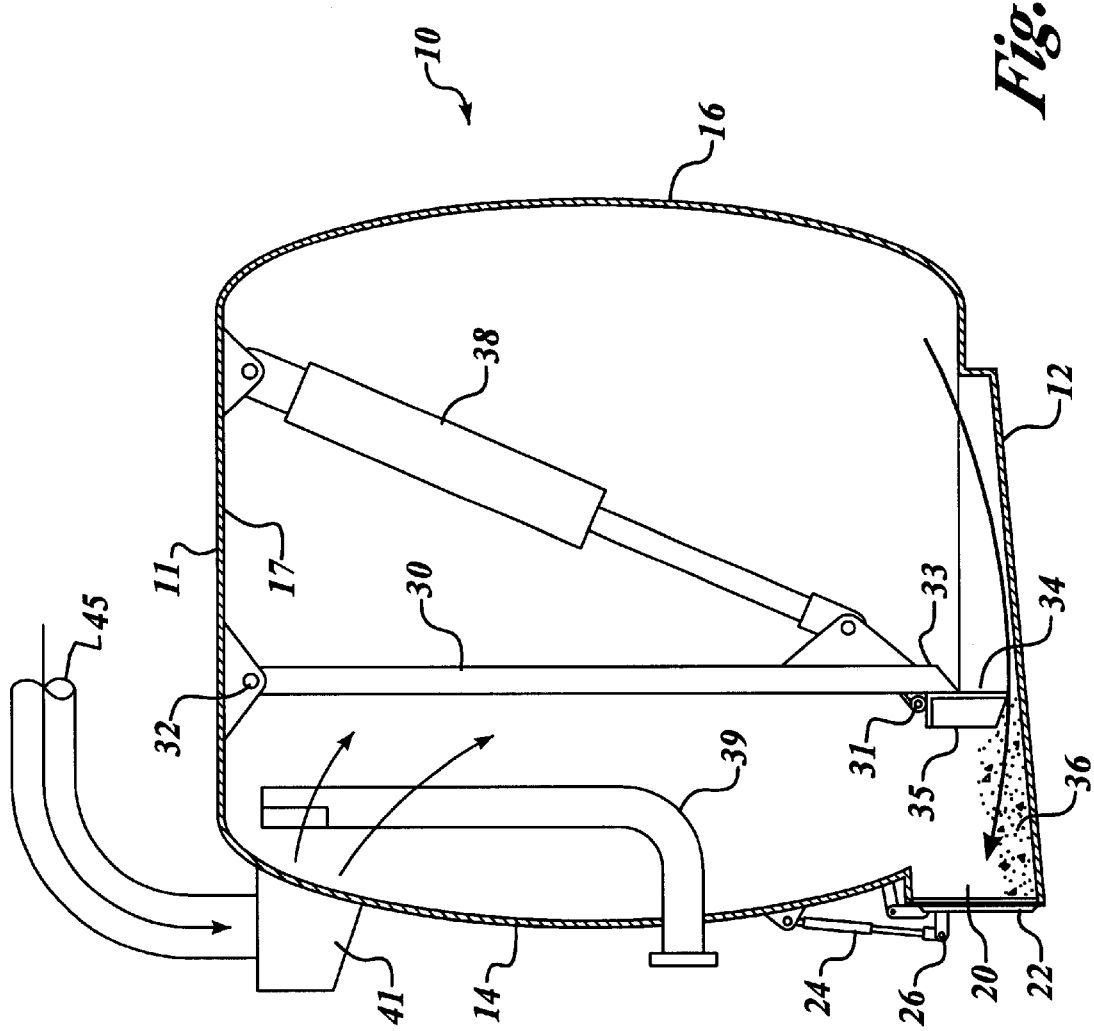
FIG. 1 is a side view schematic of a mud tank for use with sweeps according to the invention.
Figure 2:
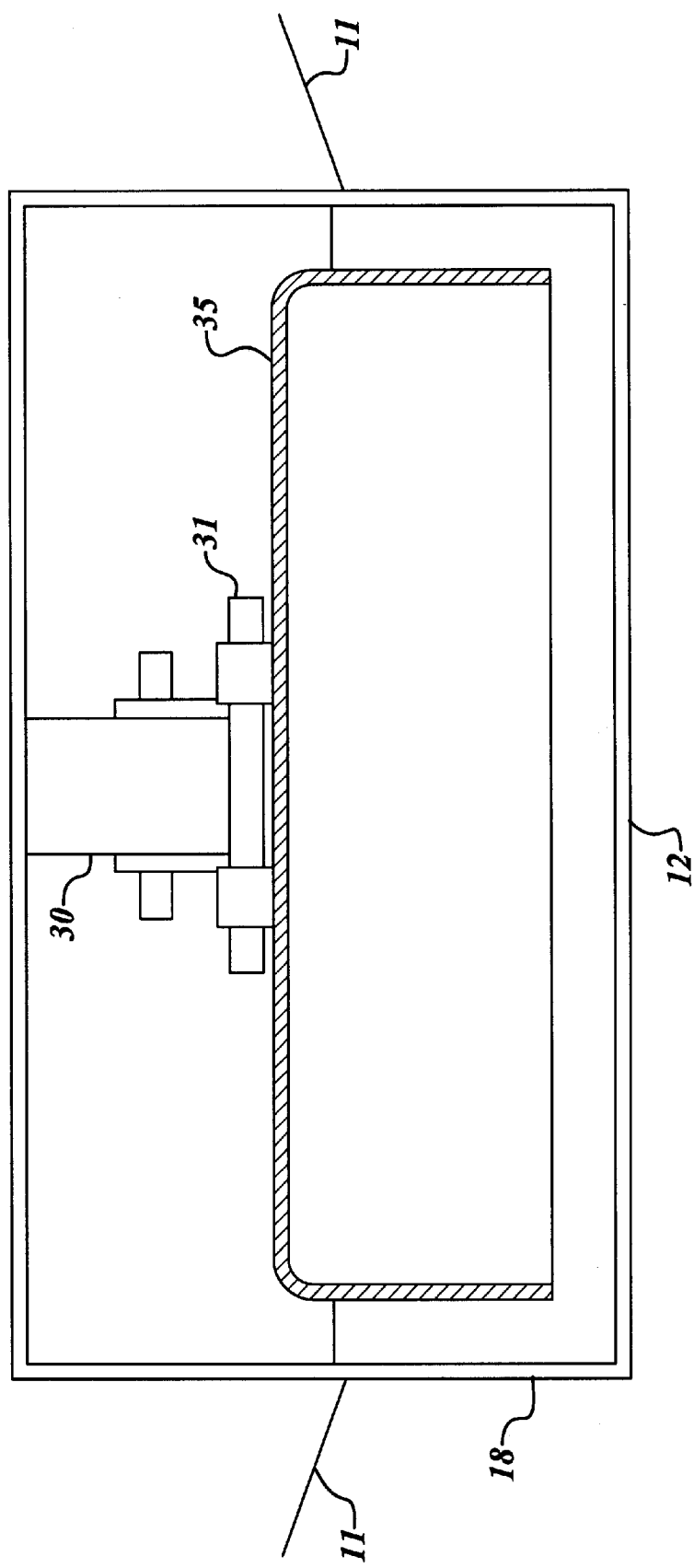
FIG. 2 is a front view of the mud tank of FIG. 1.

A mud tank cleaning system is shown in FIGS. 1, 2, 3, and 4. FIGS. 1, 2, and 3 show details of the mud tank 10. The mud tank 10 is formed of confining walls 11, 14, and 16. The mud tank 10 preferably has a cylindrical wall 11 with a depressed lower part 12, with domed access wall 14 and domed end wall 16. The lower part 12 forms a trough extending from near the end wall 16 to and beyond the access wall 14. The trough 12 deepens from end wall 16 to the access wall 14 and has near-vertical side walls 18. The trough 12 extends through a rectangular opening 20 partly in the access wall 14 and partly in the lower part of the cylindrical wall 11. The orientation of the trough 12 could be in any direction that was suitable for dumping mud from the tank 10. The opening 20 could also be in any of the walls, for example, entirely in the bottom wall. A removable cover 22 is mounted on the mud tank 10 over the opening 20 and operated by a conventional hydraulic cylinder 24 secured between the access wall 14 and a projecting arm 26 on the cover 22.

A sweep formed of a sweep arm 30 and sweeping blade 34 is mounted in the mud tank 10, for example, as shown by being mounted to a pivot 32 fastened to the roof 17 of the mud tank 10. In operation, the sweep arm 30 pivots and its lower sweeping blade 34 moves in an arc along the trough 12 of the mud tank 10 towards the opening 20, thus being operable to sweep mud 36 in the mud tank 10 towards the opening 20 in the mud tank 10. The sweep arm 30 is provided with a sweep drive mechanism operably connected to the sweep arm 30 for causing the sweep arm 30 to move across the bottom 14 of the mud tank 10 toward the opening 20. The drive mechanism is preferably a hydraulic cylinder 38 secured to the sweep arm 30 and to the roof 17, as shown in FIG. 4. Fluid for the hydraulics shown in FIG. 1 is provided by a conventional hydraulic supply and control system. Preferably, the sweep blade 34 has approximately the same shape, and is slightly smaller than, the opening 20, and is concave facing the opening 20 to contain mud being swept across the bottom of the tank. The concavity of the sweep blade 34 is preferably provided by flanges 35. It is preferred that the sweep blade 34 be slightly smaller than the opening 20, since then it can fully enter the opening to force mud out of the mud tank 10. The sweep blade 34 is preferably attached to the sweep arm 30 using a pivot mount 31 above the bottom end of the sweep arm 30. The sweep blade will therefore pivot on the sweep arm 30. The sweep blade 34 is mounted pivotally on the sweep arm 30 to allow the sweep blade 34 to swing free of mud in the mud tank when the sweep blade is moved away from the opening, while pushing mud out of the opening on the forward swing towards the opening. The pivot mount 31 is located a short distance away from the downward extremity 33 of the sweep arm 30 to form a stop that prevents the blade 34 from pivoting out of the way of the mud on the forward swing when the sweep arm moves towards the opening 20. Top and side flanges 35 on the sweep blade 34 assist in collecting the mud and preventing it from spilling over the blade 34 as it is pushed towards the opening. Conventional materials are used for the all the elements shown.

As shown in FIG. 1, the mud tank also comprises a liquid load riser 39 and entrance port 41, both of which are for receiving the fluidized soil in the tank. Air and other vapors are suctioned out of the tank 10 through a vapor outlet port 43. An overhead boom line 45 can be used to transport fluidized soil to the entrance port 41. These components are known in the art and need not be further described here.

Figure 5:
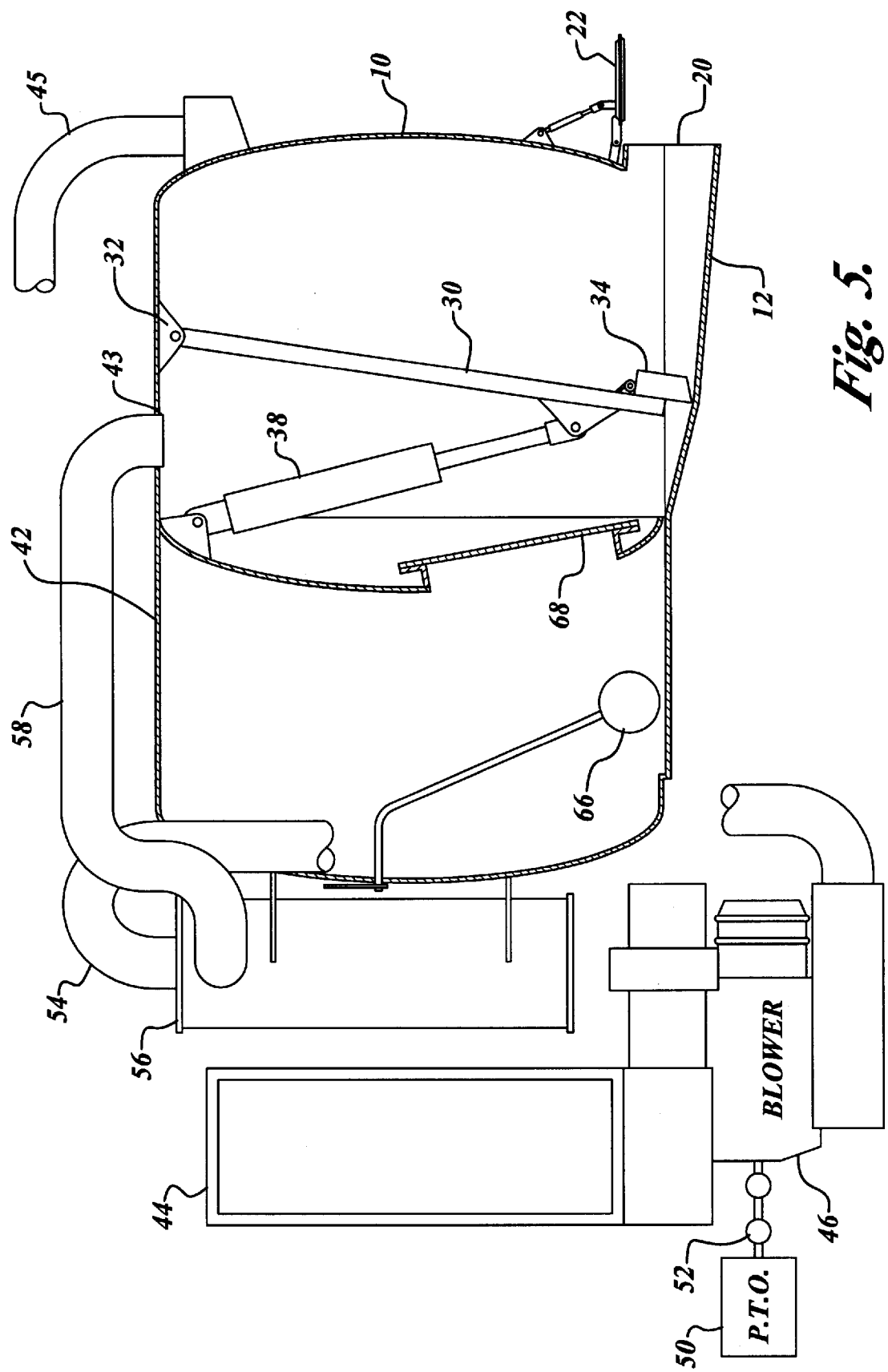
FIG. 5 is a left side view of a hydrovac unit incorporating a mud tank.
Figure 6:
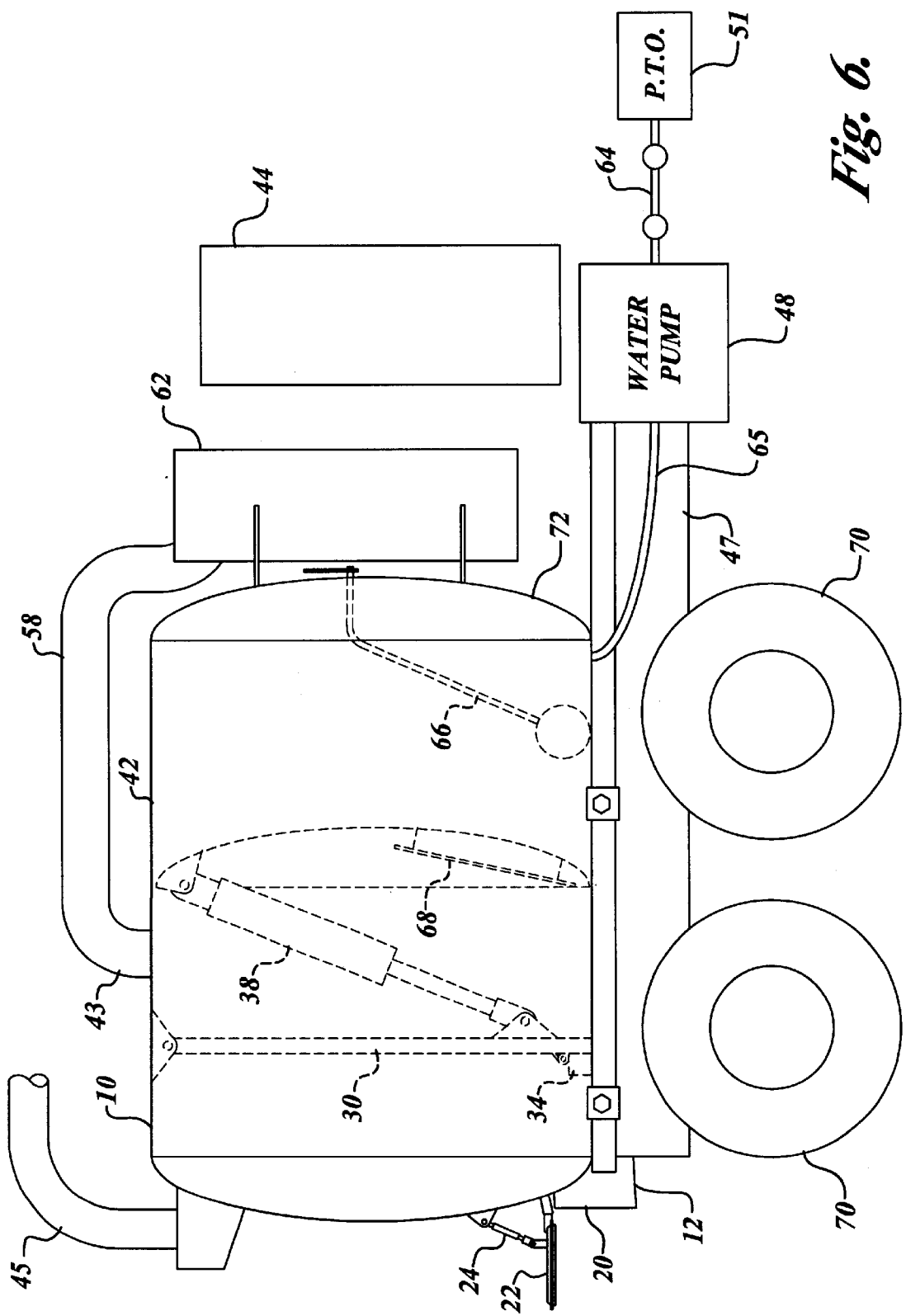
FIG. 6 is a right side view of a hydrovac unit incorporating a mud tank.
Figure 7:
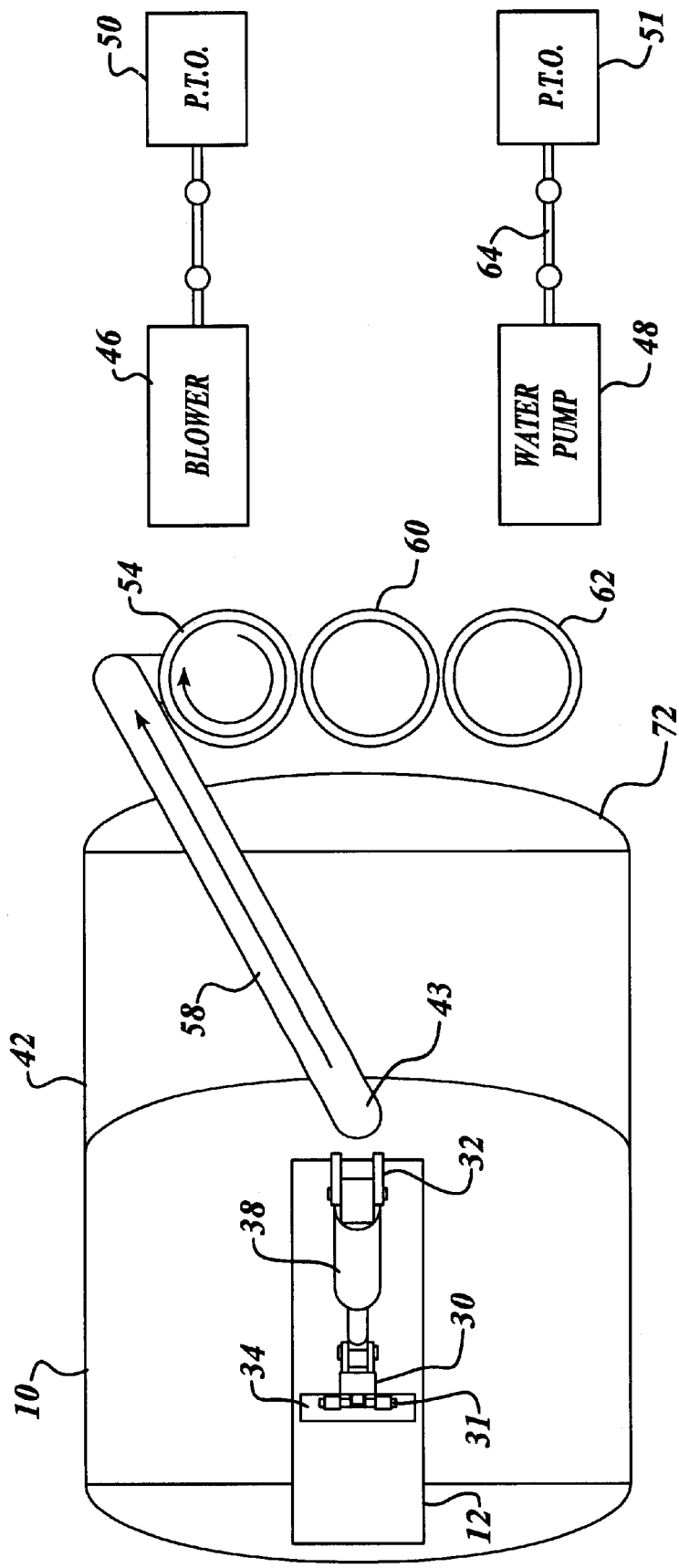
FIG. 7 is a top view of a hydrovac unit incorporating a mud tank.
Figure 9:
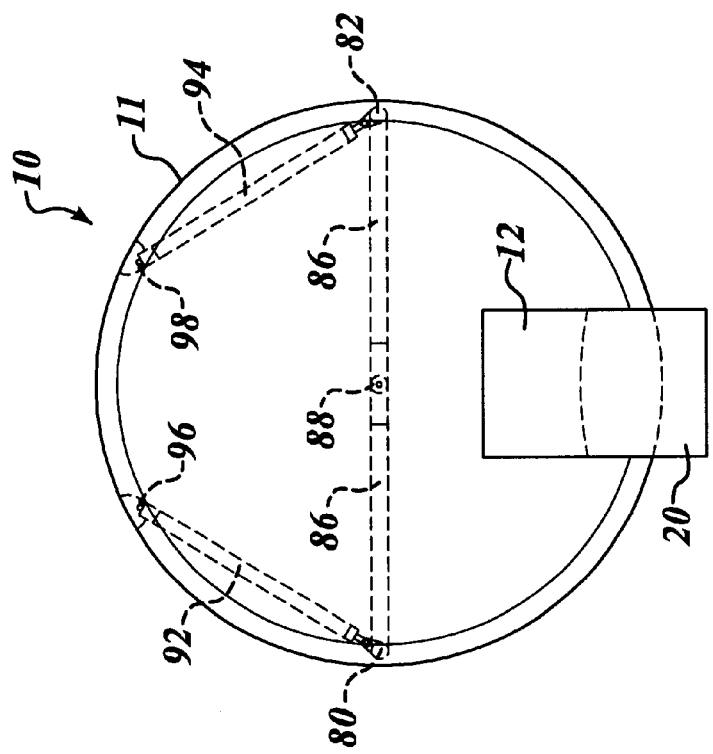
FIG. 9 is an end view of a mud tank with side sweeps according to the invention.
Figure 8:
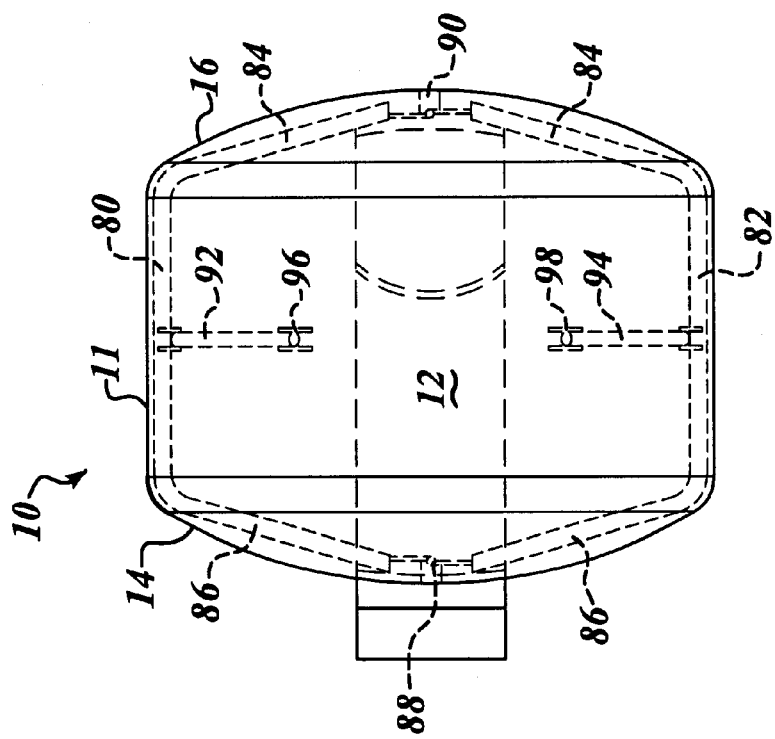
FIG. 8 is a top view of a mud tank with side sweeps according to the invention.
Figure 11:
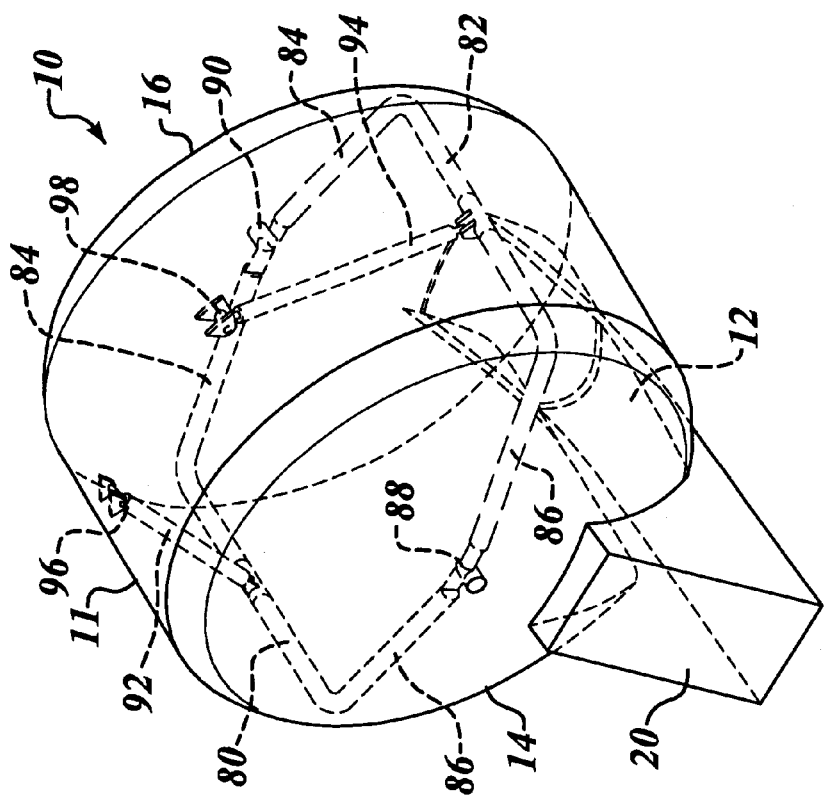
FIG. 11 is a perspective view of a mud tank with side sweeps according to the invention.
Figure 10:
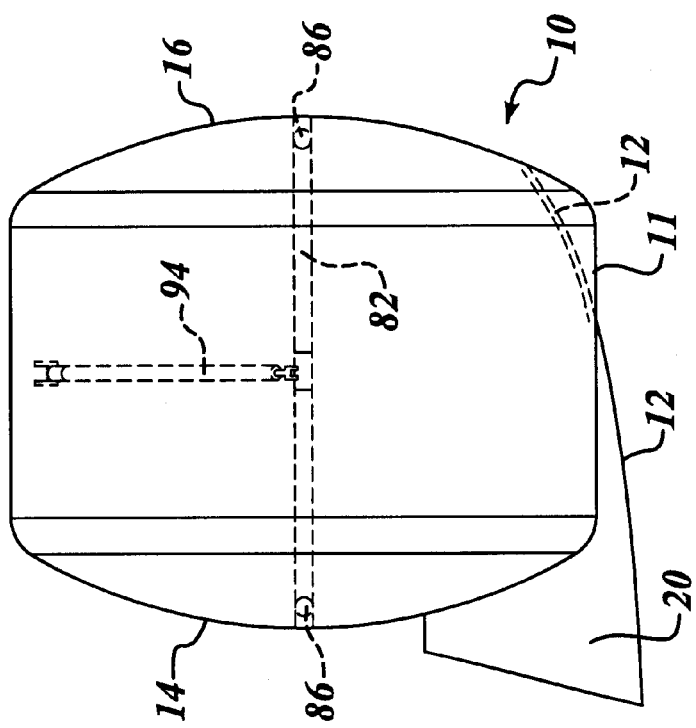
FIG. 10 is a side view of a mud tank with side sweeps according to the invention.

The mud tank 10 in FIG. 1 is shown in FIGS. 5, 6, and 7 in combination with a hydrovac vehicle 40 with water tank 42, and mechanical storage 44 having a blower 46, water pump 48 and power take-offs 50, 51 from an engine (not shown). The water tank 42 is preferably formed of a cylinder welded to the end wall 16 of the mud tank 10 and closed at the opposite end by a water tank end wall 72, thus forming a combination mud/water tank with an intervening divider, the end wall 16. The mud tank 10 and water tank 42 are bolted directly to the fame 47 of the hydrovac vehicle 40.

The blower 46 is bolted directly to the left side of the frame 47 of the hydrovac vehicle 40 forward of the water tank 42, and is connected directly by a drive shaft 52 to the power take-off 50. The blower 46 sucks air through a conventional cyclone separator 54 through line 56. The cyclone separator 54 is connected by suction line 58 to the outlet 43 from the mud tank 10. Operation of the blower 46 sucks air out of the mud tank 10 into the cyclone separator 54. A cooling air silencer 60 and discharge air silencer 62 are also provided on the hydrovac vehicle 40.

Water pump 48 is bolted to the frame 47 of the hydrovac vehicle 40 in front of the water tank 42, and is connected directly to power take-off 51 by direct drive shaft 64. Water pump 48 pumps water out of the tank 42 for use in the hydrovac digging operation through hose 65 and other conventional hoses (not shown). The water tank 42 is also provided with a water level indicator 66 and access port 68. The hydrovac vehicle 40, water tank 42, mechanical storage 44, blower 46, water tank 48, power take-offs 50, 51, cyclone 54, silencers 60, 62 and their associated connections are all conventional. On the other hand, it is believed to be new to mount the water pump 48 and blower 46 directly to the frame 47 of the hydrovac vehicle where they are readily accessible for direct drive straight to the power take-off 50, 51 for operation and maintenance. The hydrovac vehicle 40 is preferably truck mounted on wheels 70.

The hydrovac vehicle 40 has fewer moving parts and components that make it economical to build and allows for fewer breakdowns. The modular design allows the blower 46 and water pump 48 to be mounted on the frame 47 low down so that the drive shafts from the power take-offs 50, 51 are short and simple. The combination mud/water tank has few moving parts and components, and the boom 45 may be mounted directly to the end of the mud tank 10. Use of the reciprocating sweep allows the mud tank to be bolted directly to the frame, and thus allows the hydrovac vehicle to be kept simple with few moving parts. Although a preferred pivotally mounted sweep is shown, the sweep may be mounted in various ways to produce a sweeping action, including by being mounted on a reciprocating ram.

Referring to FIGS. 8, 9, 10, and 11, the side sweeps of the invention will now be described. The sweeps are mounted in the mud tank 10 as described in relation to FIGS. 1–7, with end walls 14, 16 and side connecting wall 11 which connects to the end walls 14, 16 about their respective peripheries. The depressed lower part 12 forms a collection zone for debris to collect under force of gravity in the mud tank in sufficient proximity to the opening 20 that debris in the collection zone may be moved by mechanical action, such as by sweep 34, through the opening 20. A pair of collection sweeps 80, 82, are mounted on opposed sides of the mud tank 10 to move in arcuate paths along the side connecting wall 11 from a position mid way up the connecting wall 11 to the collection zone 12. The collection sweeps 80, 82 may be made of any suitable material, could be made of plastics or metal, and may be any suitable shape, such as round tubes as shown. Preferably, the collection sweeps 80, 82 are suspended on booms 84, 86, which rotate about pivots 88, 90 on respective end walls 14, 16. Use of the pivots 88, 90 at the axis of the cylinder formed by the connecting wall 11 allows the sweeps 80, 82 to easily follow the curve of the connecting wall 11. The booms 84, 86 lie along a radius of the circle defined by a section through the cylindrical connecting wall 11. Each sweep 80, 82 is driven by a respective sweep drive mechanism 92, 94, respectively. The sweep drive mechanisms 92, 94 may be, for example, hydraulic cylinders fastened between a central point of the sweeps 80, 82 and respective pivot points 96, 98 on an upper part of the connecting wall 11. Operation of the sweep drive mechanisms 92, 94 drives the sweeps 80, 82 along the connecting wall 11 toward the collection zone 12. Any of various other structures may be used for the sweep drive mechanism, such as motors attached to the pivots 88, 90. The sweeps 80, 82 are used in conjunction with the disposal sweep 34. Conventional hydraulic controls (not shown) are used for the sweep drive mechanisms 92, 94.

Immaterial modifications may be made to the invention described here without departing from the essence of the invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A hydrovac vehicle having a frame mounted on wheels, a mud tank mounted on the frame, a water tank mounted on the frame, a water pump mounted on the frame and hydraulically connected to the water tank to pump water from the water tank for use in hydrovac operations, a blower mounted on the frame and connected by lines to the mud tank for removing fluids from the mud tank, and a boom line mounted on the mud tank for conveying fluidized materials to the mud tank, the mud tank comprising:

confining walls;

a collection zone in the mud tank for collection of debris under action of gravity;

an opening in the confining walls of the mud tank, the opening being located in sufficient proximity to the collection zone that debris in the collection zone may be moved by mechanical action through the opening;

a removable cover mounted on the mud tank over the opening;

a disposal sweep mounted in the mud tank and having an upwardly extending sweep arm, the disposal sweep being operable to sweep mud in the mud tank along the collection zone towards the opening in the confining walls; and a collection sweep mechanism mounted in the mud tank for sweeping mud along the confining walls towards the collection zone.

2. The hydrovac vehicle of claim 1 in which the confining walls comprise a cylindrical connecting wall extending between a pair of end walls.

3. The hydrovac vehicle of claim 2 in which the collection sweep mechanism is pivotally mounted in the mud tank.

4. The hydrovac vehicle of claim 3 in which the collection sweep mechanism is pivotally mounted from the end walls.

5. The hydrovac vehicle of claim 1 in which the collection zone is a trough in the connecting wall.

6. The hydrovac vehicle of claim 1 in which the collection sweep mechanism comprises a first sweep and a second sweep mounted for sweeping towards the collection zone from respective opposed sides of the collection zone.

7. The hydrovac vehicle of claim 6 in which the first sweep and the second sweep each have a sweep path that terminates at the edge of the collection zone.

8. The hydrovac vehicle of claim 1 in which the collection sweep mechanism sweeps along a path that terminates at the edge of the collection zone.

* * * * *

UNITED STATES PATENT AND TRADEMARK OFFICE
CERTIFICATE OF CORRECTION

PATENT NO. : 6,607,666 B2  Page 1 of 1
DATED : August 19, 2003
INVENTOR(S) : R.C. Rajewski It is certified that error appears in the above-identified patent and that said Letters Patent is hereby corrected as shown below:

<u>Title page,</u>
Before Item [56], please insert:
-- [30] Foreign Application Priority Data
Jul. 6, 2001 (CA) 2352619 --

Signed and Sealed this

Second Day of March, 2004

JON W. DUDAS
*Acting Director of the United States Patent and Trademark Office*